(12) United States Patent
Camus (10) Patent No.: US 8,598,893 B2
(45) Date of Patent: Dec. 3, 2013

(54) PRESSURE SENSOR COMPRISING A CAPACITIVE CELL AND SUPPORT DEVICE COMPRISING SAID SENSOR

(75) Inventor: Gilles Camus, Montpellier (FR)

(73) Assignee: Hill-Rom Industries SA, Montpellier (FR)

( * ) Notice: Subject to any disclaimer, the term of this patent is extended or adjusted under 35 U.S.C. 154(b) by 751 days.

(21) Appl. No.: 12/781,426

(22) Filed: May 17, 2010

(65) Prior Publication Data

US 2010/0308846 A1    Dec. 9, 2010

(30) Foreign Application Priority Data

Jun. 5, 2009    (FR) ...................................... 09 53758

(51) Int. Cl.
*G01R 27/26*    (2006.01)

(52) U.S. Cl.
USPC ............................ 324/661; 324/658; 324/662

(58) Field of Classification Search
USPC ........................................................ 324/661
See application file for complete search history.

(56) References Cited

U.S. PATENT DOCUMENTS

| | | |
|---|---|---|
| 3,533,095 A | 10/1970 | Collins |
| 3,752,144 A | 8/1973 | Weigle, Jr. |
| 3,766,344 A | 10/1973 | Nevett |
| 3,781,843 A | 12/1973 | Harrison et al. |
| 3,796,208 A | 3/1974 | Bloice |
| 3,836,900 A | 9/1974 | Mansfield |
| 3,852,736 A | 12/1974 | Cook et al. |
| 3,890,958 A | 6/1975 | Fister et al. |
| 3,961,201 A | 6/1976 | Rosenthal |
| 3,991,414 A | 11/1976 | Moran |
| 3,991,746 A | 11/1976 | Hanna |
| 4,020,482 A | 4/1977 | Feldl |
| 4,051,721 A * | 10/1977 | Williams ................. 73/862.381 |
| 4,067,005 A | 1/1978 | Levy et al. |
| 4,140,998 A | 2/1979 | Bettle |
| 4,175,263 A | 11/1979 | Triplett et al. |
| 4,179,692 A | 12/1979 | Vance |
| 4,186,734 A | 2/1980 | Stratton |
| 4,195,287 A | 3/1980 | McCoy et al. |

(Continued)

FOREIGN PATENT DOCUMENTS

| | | |
|---|---|---|
| DE | 30 11 266 A1 | 10/1981 |
| EP | 0 441 381 A | 8/1991 |

(Continued)

OTHER PUBLICATIONS

Why Build Capacitive Load Cells, LoadStar Sensors, www.loadstarsensors.com, p. 1-3.*

(Continued)

*Primary Examiner* — Thomas Valone
(74) *Attorney, Agent, or Firm* — Barnes & Thornburg LLP (57) ABSTRACT

A sensor for detecting and measuring a load pressure applied to a support device comprises at least one capacitive cell including a flat condenser comprising at least one layer of a compressible insulating dielectric material interposed between two layers of conductive material. A support device capable of supporting the body of a person comprises at least one top layer composed of a plurality of air-filled inflatable cells communicating with inflation elements, characterized in that it comprises a sensor, of which said condenser is disposed under said top layer and connected to an electronic control and regulation device capable of controlling inflation or deflation elements.

15 Claims, 7 Drawing Sheets

(56) References Cited

U.S. PATENT DOCUMENTS

| | | |
|---|---|---|
| 4,228,426 A | 10/1980 | Roberts |
| 4,231,030 A | 10/1980 | Weiss |
| 4,242,672 A | 12/1980 | Gault |
| 4,263,586 A | 4/1981 | Nicholas |
| 4,264,904 A | 4/1981 | McCoy et al. |
| 4,295,133 A | 10/1981 | Vance |
| 4,320,766 A | 3/1982 | Alihanka et al. |
| 4,336,533 A | 6/1982 | Wettach |
| 4,348,562 A | 9/1982 | Florin |
| 4,474,185 A | 10/1984 | Diamond |
| 4,536,755 A | 8/1985 | Holzgang et al. |
| 4,539,560 A | 9/1985 | Fleck et al. |
| 4,577,185 A | 3/1986 | Andersen |
| 4,583,084 A | 4/1986 | Henderson et al. |
| 4,584,625 A | 4/1986 | Kellogg |
| 4,624,784 A | 11/1986 | Lefebvre |
| 4,633,175 A | 12/1986 | Ritchie et al. |
| 4,633,237 A | 12/1986 | Tucknott et al. |
| 4,638,307 A | 1/1987 | Swartout |
| 4,777,944 A | 10/1988 | Green et al. |
| 4,796,013 A | 1/1989 | Yasuda et al. |
| 4,800,973 A | 1/1989 | Angel |
| 4,805,637 A | 2/1989 | Walthert |
| 4,814,661 A | 3/1989 | Ratzlaff et al. |
| 4,858,622 A | 8/1989 | Osterweil |
| 4,907,845 A | 3/1990 | Wood |
| 4,934,468 A | 6/1990 | Koerber, Sr. et al. |
| 4,947,152 A | 8/1990 | Hodges |
| 4,947,298 A | 8/1990 | Stephen |
| 4,951,032 A | 8/1990 | Langsam |
| 4,953,244 A | 9/1990 | Koerber, Sr. et al. |
| 4,972,177 A | 11/1990 | Nolan |
| 5,008,654 A | 4/1991 | Callaway |
| 5,140,309 A | 8/1992 | Gusakov |
| 5,144,284 A | 9/1992 | Hammett |
| 5,150,104 A | 9/1992 | Thomas et al. |
| 5,170,364 A | 12/1992 | Gross et al. |
| 5,184,112 A | 2/1993 | Gusakov |
| 5,235,319 A | 8/1993 | Hill et al. |
| 5,253,656 A | 10/1993 | Rincoe et al. |
| 5,276,432 A | 1/1994 | Travis |
| 5,319,813 A | 6/1994 | DiMatteo et al. |
| 5,353,012 A | 10/1994 | Barham et al. |
| 5,393,935 A | 2/1995 | Hasty et al. |
| 5,410,297 A | 4/1995 | Joseph et al. |
| 5,446,391 A | 8/1995 | Aoki et al. |
| 5,448,996 A | 9/1995 | Bellin et al. |
| 5,459,452 A | 10/1995 | DePonte |
| 5,471,198 A | 11/1995 | Newham |
| 5,479,939 A | 1/1996 | Ogino |
| 5,494,046 A | 2/1996 | Cross |
| 5,515,044 A | 5/1996 | Glatt |
| 5,519,380 A | 5/1996 | Edwards |
| 5,543,777 A | 8/1996 | Vane et al. |
| 5,564,144 A | 10/1996 | Weingartner et al. |
| 5,602,734 A | 2/1997 | Kithil |
| 5,633,627 A | 5/1997 | Newham |
| 5,697,366 A | 12/1997 | Kimball et al. |
| 5,699,038 A | 12/1997 | Ulrich et al. |
| 5,791,344 A | 8/1998 | Schulman et al. |
| 5,800,480 A | 9/1998 | Augustine et al. |
| 5,802,479 A | 9/1998 | Kithil et al. |
| 5,808,552 A | 9/1998 | Wiley et al. |
| 5,823,278 A | 10/1998 | Geringer |
| 5,918,696 A | 7/1999 | VanVoorhies |
| 6,009,580 A * | 1/2000 | Caminade et al. ............... 5/713 |
| 6,067,019 A | 5/2000 | Scott |
| 6,094,762 A | 8/2000 | Viard et al. |
| 6,109,117 A | 8/2000 | Stanley et al. |
| 6,161,891 A | 12/2000 | Blakesley |
| 6,169,138 B1 | 1/2001 | Petit et al. |
| 6,208,250 B1 | 3/2001 | Dixon et al. |
| 6,289,749 B1 | 9/2001 | Sanders |
| 6,386,051 B1 | 5/2002 | Yoshimi et al. |
| 6,404,106 B1 | 6/2002 | Dale et al. |
| 6,417,466 B2 | 7/2002 | Gross et al. |
| 6,778,090 B2 | 8/2004 | Newham |
| 6,999,301 B1 * | 2/2006 | Sanftleben et al. ........... 361/312 |
| 7,296,312 B2 | 11/2007 | Menkedick et al. |
| 7,409,735 B2 | 8/2008 | Kramer et al. |
| 7,459,645 B2 | 12/2008 | Skinner et al. |
| 7,464,605 B2 | 12/2008 | Douglas et al. |
| 7,752,926 B2 | 7/2010 | Caminade et al. |
| 2002/0080037 A1 | 6/2002 | Dixon et al. |
| 2003/0200611 A1 | 10/2003 | Chaffee |
| 2005/0110617 A1 * | 5/2005 | Kile et al. ............... 340/286.07 |
| 2006/0070456 A1 | 4/2006 | Douglas et al. |
| 2009/0056020 A1 | 3/2009 | Caminade et al. |

FOREIGN PATENT DOCUMENTS

| | | |
|---|---|---|
| EP | 0 855 307 A2 | 7/1998 |
| EP | 1 821 088 | 8/2007 |
| EP | 2 005 929 A1 | 12/2008 |
| EP | 2 031 362 A1 | 3/2009 |
| FR | 2 757 377 | 6/1998 |
| FR | 2 757 378 | 6/1998 |
| GB | 1 336 488 | 11/1973 |
| JP | 2004-20440 | 1/2004 |
| WO | WO 89/02635 | 3/1989 |
| WO | WO 98/25112 | 6/1998 |
| WO | WO 99/39613 | 8/1999 |

OTHER PUBLICATIONS

Foamular Extruded Polystyrene, Technical Bulletin, Owens Corning, 2011, p. 1.*
LessEMF, EMF Shielding and Conductive Fabrics, www.lessemf.com/fabric.html, p. 1-25.*
Durometer: Hardness of Rubber, Measure of hardness of rubber compounds, RubberMill.com, p. 1.*
English translation of Preliminary Search Report from French National Application No. FR 0953758, dated Jan. 22, 2010, 10 pages.
European search report from EP10 25 1020 dated Sep. 22, 2010.

* cited by examiner

PRESSURE SENSOR COMPRISING A CAPACITIVE CELL AND SUPPORT DEVICE COMPRISING SAID SENSOR

The present application claims priority, under 35 U.S.C. §119(a), of French National Application No. 0953758 which was filed Jun. 5, 2009 and which is hereby incorporated by reference herein.

BACKGROUND AND SUMMARY

The present disclosure relates to a sensor for detecting and measuring load pressure designed for measuring pressures exerted by an object on a support device, such as the body of a person reclining or seated on a support device such as a mattress or cushion, wherein said sensor is interposed between said object and said support device. More particularly, this type of pressure sensor is designed to be disposed under a portion of a mattress, wherein said portion of the mattress is interposed between a patient and the sensor, and said mattress is of the air-inflated cell type.

The pressure measured by said sensor varies as a function of the patient's weight and his contact surface with the mattress. The load pressure thus determined, notably in the sacral region, makes it possible in a known manner, notably by calibration, to regulate the ideal inflation pressure of the air inside the cells of said mattress, i.e., to adjust the pressure of the air inside the cells in order to obtain an ideal load bearing of the patient by the mattress in order to minimize the interface pressure exerted by the mattress on the patient's skin and thus reduce the risk of bedsores forming.

An application benefitting from the sensor disclosed herein, however, relates to the detection and measurement of pressures applied by the bodies of patients reclining or seated on medical support devices such as therapeutic mattresses, and notably support devices of the inflatable air-filled cell cushion or mattress type, in order to regulate the inflation pressure of the cells of the support device to prevent skin diseases linked to a prolonged immobilization on a bed or a couch. In medical practice, it is known that the interface pressures between the bodies of patients and their support devices constitute the main factor responsible for the development of skin complications, notably bedsores, due to periods of prolonged immobility of the patients on their beds or couches.

One of the proven techniques for preventing the formation and development of bedsores in patients consists of supporting the patients on beds comprising inflatable air-filled cell mattresses in which the air pressure is regulated relative to the morphology and weight of the patient with the aim of minimizing the interface pressures between the patient's body and the surface of the mattress. From load pressure data exerted by the patient on a given mattress in a particular area such as the sacral region, the ideal indentation profile of the patient over the entire surface of the mattress can be deduced and hence the value of the internal air pressure in the mattress can be adjusted for obtaining an ideal support of the patient on the mattress.

Measurement of the interface pressures or load pressure is notably achieved with sensors employing diverse technologies, which as a general rule are disposed under the inflatable cells of the mattresses on which the patients are reclining.

According to other application modes of a pressure sensor of this disclosure, said sensor can be used in a car or an airplane seat or even in combination with a conveyor belt designed to transport objects.

Depending on their technology, these sensors enable the determination of the "waterline," i.e., the indentation distance of the patients' bodies on the inflatable cells of their support devices, or the pressures applied by the patients' bodies on the inflatable cells of their support devices.

As a function of the response signal of the sensor, the indentation depth or the pressure applied by the body on the support device is determined by an electronic control and regulation device and compared to predetermined set points in relation to the morphology of the patient and the mattress concerned. When the depth or the pressure calculated from the response signal of the sensor falls outside the range of set points, the electronic control and regulation device actuates inflation elements or deflation elements in order to adjust the inflation pressure of the inflatable cells of the support device for ensuring a level of support and comfort adapted to the patient's morphology and position.

As mentioned previously, nowadays there are various types of sensors that have been developed specifically for regulating the inflation pressure of inflatable-cell support devices such as therapeutic mattresses.

Particular mention may be made of the applicant's documents FR-A-2757378 and WO-A-9939613, which describe, respectively, two sensors with different technologies.

The document FR-A-2757378 describes an inflatable-cell support device comprising a control device consisting of an inductive sensor disposed under the inflatable cells of the mattress in the patient's sacral region. The inductive sensor makes it possible to measure an indentation distance of the body of a patient reclining on the support device comprising the sensor and to control the inflation elements of the cells in order to regulate the inflation pressure of the cells in relation to the indentation distance measured by the sensor. A first disadvantage of such an inductive sensor resides in its high manufacturing cost, which strongly impacts the cost of the support device itself. Furthermore, such an inductive sensor exhibits a thickness of at least 5 cm, which in turn confers a significant thickness of the support device in which it is integrated, making it more difficult to ensure adequate coverage by the safety rails installed on the frame of the support device for preventing falls. Lastly, because such an inductive sensor is an electromagnetic field sensor, it must satisfy the requirements of the electromagnetic compatibility (EMC) standards.

The document WO-A-9939613 also discloses an inflatable-cell support device for supporting a patient's body. This support device comprises a pressure sensor in turn comprising an inflatable chamber inflated to a predetermined pressure. The sensor is housed under the inflatable cells in the sacral support zone of the patient. Hence, the internal pressure of the inflatable chamber of the sensor varies according to the pressure variations inside the inflatable cells of the support device in relation to the morphology, weight, and movements of the patient reclining on the support device. Electronic elements then compare the respective pressures in the inflatable chamber of the sensor and in the inflatable cells of the support device and then control the inflation elements accordingly to regulate and adjust the inflation pressure inside the cells when the pressure comparison falls outside a predetermined range of set points. In order to ensure its sensor function, the sensor is filled with a weakly compressible fluid, such as silicone oil. As with the inductive sensors, a disadvantage of such a hydraulic sensor resides in the high manufacturing cost, which strongly impacts the cost of the support device itself. Furthermore, such a hydraulic sensor also exhibits a thickness of at least 3 cm, which in turn confers a significant thickness on the support device in which it is integrated, making it more difficult to ensure adequate coverage by the safety rails installed on the frame of the support device for preventing falls. Lastly, such a sensor of the inflatable chamber type is heavy because it contains approximately 4 kg of silicone oil, making it difficult to handle.

The main disadvantage of the various sensors and systems associated with regulating the inflation pressure of the cells in mattresses and other therapeutic support devices resides in the costs associated with their manufacture and use, which limits their utility in support devices for hospital use, particularly in wards specializing in the care and treatment of patients with extremely limited mobility and/or at high risk of developing bedsores.

Hence, there exists a technical problem consisting of designing and manufacturing a pressure sensor suitable for use in inflatable-cell support devices, and particularly in devices of therapeutic mattress or cushion type, for enabling regulation of the pressure inside the cells, wherein said sensor is less heavy, less bulky and less expensive to manufacture than prior art sensors and systems, while at the same time achieving similar or even improved performances. Such a sensor is particularly desirable for reducing the cost of these support devices and hence enabling their purchase and use in the scope of home medical care.

EP-2 031 362 describes a sensor of the FSR (Force Sensing Resistor) cell type based on the principle of measuring an impedance varying as a function of the compression force in kg/cm$^2$ exerted on the cell. In EP-2 031 362, a specific number of characteristics for force sensing resistor cells was determined for enabling the generation of an electric signal and an appreciably linear response within a range of load pressures corresponding to a patient's weight in the range of between at least 50 and 140 kg. However, this type of FSR sensor is sensitive to the creeping of its sensitive element, namely a silver-based conductive ink, hence a periodic slackening of the load is required in order to avoid a drift or even a saturation of the response of the sensor over time. Furthermore, the measurement surface of the FSR sensor described in this patent, which sensor consists of a plurality of parallel-connected cells, is relatively small. In fact, an FSR sensor as described in EP 2 031 362 is designed in particular for regulating the internal air inflation pressure of mattress cells by a so-called "alternate inflation" process, wherein each cell is successively inflated and deflated in such a way that only every other cell is inflated, whereas the cells adjacent to each inflated cell are deflated, and vice versa successively. Hence, the FSR sensor in contact with the inflated cells is only subjected to said load pressure of the patient's body for a time limited to the duration of the inflation period.

Said FSR sensor is inexpensive yet gives good results for the application for which it is designed, namely pressure regulation for an air mattress without excessively high precision and suitable for a mattress that does not require high performances.

One aspect of the sensor disclosed herein is the provision of a novel type of higher precision pressure sensor that is not subject to the phenomenon of drift or saturation of its response over time if it is continuously subjected to a load on the one hand, and on the other hand, which makes it possible to distinguish weights of light patients, notably weights less than 40 kg or even less than 30 kg.

Capacitive sensors based on the variation of the capacitance of a condenser in relation to the distance between its conductive plates are known in the prior art. In electricity, a condenser is composed of two conductive plates separated by a so-called dielectric insulator. A flat condenser has a capacitance (C) expressed in picofarads (pF) by the formula $C = \epsilon_0 \times \epsilon_R \times S/d$, where:

S is the surface of a conductive plate,
d is the distance between the conductive plates or the thickness of the dielectric,
$\epsilon_0$ is the vacuum permittivity constant (8.85 pF/m),
$\epsilon_R$ is the dielectric constant of the dielectric material.

If the thickness d of the dielectric is varied, the value of the capacitance varies logarithmically: $C=f(1/d)$.

There are two types of prior art systems using capacitive sensors:

presence sensors operate on an all-or-nothing principle with a change of logic 0 or 1 in response to a variation in capacitance and possibly when a capacitance threshold is detected. In this type of application, the sensor does not require provision of an analog signal with a sensitive and adjusted response comprising at least one zone of linearity for the signal in relation to, e.g., the load exerted on the sensor. Essentially a YES/NO logic response is sought, depending on contact or the absence of contact with the sensor, and capacitive measurement sensors used in laboratories measure the load time of the condenser ($t = R \times C$), where R is the resistance placed in series with the condenser. In this type of application, the circuit is supplied with continuous voltage and the time needed for the voltage of the condenser to attain a known level is measured. This type of capacitive sensor is very expensive and relatively fragile, and furthermore requires frequent recalibration because of its drift over time.

The sensor disclosed herein makes provision of a capacitive pressure sensor that is suitable from both a technical and economic standpoint for regulating the inflation of the cells in an air-filled inflatable-cell mattress on which a person is resting relative to the load detected by the sensor and notably by a single sensor placed as needed in a single zone of the mattress, notably in the sacral region. Furthermore, the apparatus disclosed herein makes provision of a sensor suitable for generating usable responses while being disposed under the mattress in order to prevent, among other things, the sensor from coming into contact with the patient, which could cause bedsores to form.

More particularly, the apparatus disclosed herein makes provision of a sensor that gives a response that is the most adapted in terms of sensitivity to the electric signal, exhibiting a zone of proportionality for the signal in relation to the load exerted on the sensor, at least for loads corresponding to patients' weights ranging from 40 to 120 kg, or even from 20 to 240 kg.

More precisely, the apparatus disclosed herein makes provision of a sensor for detecting and measuring a load pressure P applied to a support device, characterized in that it comprises at least one capacitive cell comprising a flat condenser comprising at least one layer of a compressible dielectric insulating material interposed between two layers of conductive material.

A sensor of the present invention exhibits the feature of being relatively inexpensive and less bulky, notably in terms of thickness while still exhibiting properties of high sensitivity and rapid stabilization of the measured electric signal, making it suitable for providing reliable data in the scope of an electronic control loop regulating the air pressure in an air-filled cell mattress cooperating with said sensor and with the mattress on which a person is resting, in relation to the load pressure exerted by said person on said sensor.

The compressibility of the dielectric insulating material makes it possible to vary the thickness d thereof relative to the load pressure applied on top of the dielectric layer and thus to vary the capacitance of the condenser relative to the load applied to the sensor. This condenser comprises a stack of flat layers and sheets, forming a flexible condenser capable of withstanding deformation, but preferably designed to be applied to an appreciably flat and rigid reference surface or support surface in such a way that the compression of the dielectric is essentially due to the force generated by the patient. Alternatively, the force applied may indent the sensor into the reference surface and the latter would absorb a portion of the applied force. In a use for monitoring the inflation pressure of an air cell mattress, the sensor is sometimes placed under the mattress, between the mattress and a relatively rigid box spring or within the mattress above a semi-rigid foam layer.

A sensor of the present disclosure may mainly be used to determine the weight of a person resting on a support device such as a mattress, as shall be explained hereafter. However, a sensor of the type contemplated herein can also be used to determine the patient's position on the mattress, namely seated or reclined and if need be, whether lying on his back or side. Essentially, the force applied to the sensor does not change; however, the load-bearing surface does change and hence the load pressure changes in relation to the patient's position, inducing a change in the indentation of the layer of compressible insulating material and hence a variation of the capacitance of the condenser.

In a known manner, a physical quantity such as electric capacitance cannot be used as is and must be converted into an electric signal. Inasmuch as a condenser is mainly used with alternating current, direct current cannot pass through the dielectric layer, as it is an insulator. The capacitive sensor is therefore integrated in an oscillator of which the frequency varies if the capacitance of the sensor varies. "Integrated in an oscillator" is understood to mean that said flat condenser of the present disclosure constitutes the condenser of said oscillator.

More precisely, said capacitive cell is integrated in an oscillator capable of generating a periodic electric signal, with preference being given to an oscillator of astable multivibration type generating a rectangular signal, wherein the frequency of said periodic signal varies as a function of said load pressure P, preferably in a range of between 15 and 30 kHz, more preferably with a variation of at least 45 Hz/kg and still more preferably of at least 50 Hz/kg for a weight of 0 to 80 kg applied to the surface of said flat condenser ($1a$).

The lower limit of 15 kHz ensures that the signal is completely inaudible, i.e., above the audible frequencies that could generate an annoying whistling, and the upper limit of 30 kHz complies with the electromagnetic compatibility (EMC) regulations and thus avoids electromagnetic interferences with the operation of other nearby electronic devices.

The capacitive sensor in the present application exhibits characteristics that enable it to deliver a signal exhibiting the following properties:
- a sensitivity, making it possible to distinguish a load variation to the nearest kg in the range of 0 to 80 kg applied to a sensor surface representing approximately one-third of the surface area of the body,
- a linearity of the signal up to approximately 40 kg (or a 120-kg patient) without saturation of the signal at loads greater than 40 kg, i.e., this value still generates a variation in capacitance in relation to the load, and
- a rapid stabilization of the signal, wherein the stabilization of the sensor response must be obtained after at most 30 seconds, and the variation of the sensor signal must furthermore be essentially due solely to the variation of the physical quantity being measured.

These different properties enable the employment of a single pressure sensor positioned notably in the sacral region and corresponding approximately to one-third of the surface area of the patient's body for regulating the inflation pressure of the air inside the cells of the mattress on which the patient is resting.

Various types of oscillators are familiar to the professional skilled in the art. An oscillator of astable multivibration type generating a rectangular signal is the simplest basic assembly, using only a few standard and inexpensive components. Furthermore, it is possible to obtain a rapid stabilization of the frequency, as these frequency variations essentially depend solely on the variation of the capacitance of the sensor. In addition, the rectangular signal delivered by the oscillator has the feature of being directly exploitable by the electronic logic processing circuits for the signals.

In some embodiments, however, said oscillator is coupled to a converter for converting the frequency (Hz) signal output by the oscillator to a voltage signal.

However, it is possible to use the frequency modulated signal output by the oscillator and dispense with the frequency/voltage conversion when the signal is processed by a microcontroller or microprocessor system.

In some contemplated embodiments, said layer of compressible dielectric material exhibits a thickness of 0.3 to 1 mm, with preference being given to 0.5 mm±20%.

As the capacitance variance is expressed as $1/d$, too great a thickness d (greater than 1 mm) would result in a condenser of very weak capacitance subject to interference from other condensers in the environment, such as the electric capacitance of the patient himself. Conversely, insufficient thickness of the dielectric would lead to saturations of the sensor due to crushing of the dielectric insulating layer, and in this case, the response would become constant above a certain applied load.

A good compromise is obtained when the layer of dielectric insulating material consists of a solid elastomer sheet, preferably a synthetic elastomer such as silicone, with a Shore hardness of 45 to 55 Sh, preferably 50 Sh±5%. A Shore hardness outside this range would not give rise to the desired sensitivity and stability properties. If the material is too soft, it will tend to be crushed and the sensor will no longer be capable of reacting in a discriminatory manner above a certain load. Conversely, if the material is too hard, there will be no response with light loads.

The thickness and hardness characteristics of the material given above confer optimum sensitivity and stabilization to the electric signal with loads ranging from 0 to 80 kg applied to the sensor, which correspond to weights ranging from 0 to 240 kg of persons resting on the mattress.

More precisely, said conductive layers are composed of sheets of fabric comprising, at least partially, metallic threads of a non-oxidizing metal, or sheets of non-woven materials consisting of entwined fibers comprising at least a portion of fibers that are metallic fibers.

These embodiments of conductive sheets enable the provision of sheets of flexible material capable of accepting movements on a rigid surface on which said material is resting. However, the sensor in its final state should remain flexible and pliable with no memory effect, i.e., returning to its original shape when it is no longer subject to deformation, as otherwise, its electric capacitance would be affected. To this end, materials woven from metallic threads or non-woven materials composed of metallic fibers mixed with plastic threads or fibers, respectively, are known to the professional skilled in the art; they are used notably as electromagnetic shielding.

The thickness of the conductive sheets does not affect the value of the electric capacitance. However, the less the thickness, the greater the gain will be in terms of flexibility, lightness, and cost savings of the sensor of the type disclosed herein. In practice, the total thickness of said capacitive cell comprising said dielectric insulating layer between the two woven or non-woven conductive sheets can be less than 5 mm.

A fabric composed of metallic threads or a non-woven material made of metallic fibers is capable of accepting mechanical deformations and returning to its initial shape at rest, in contrast to a metal sheet made of solid material, which can only accept slight deformations. As metals are only very weakly elastic, an excessively high mechanical stress above their elastic limit induces a permanent deformation. On the other hand, due to the fact that the fibers are not interconnected in a metal fabric or in a non-woven material composed of metallic fibers, the mechanical deformations of the material can be absorbed without permanently changing its structure.

Preference is given to said conductive sheet being composed of a woven material made of threads of a non-oxidizing metal such as nickel and plastic threads, with preference being given to polyester or polypropylene. Conductive sheets of this type exhibit a resistivity of less than 1 ohm/$m^2$.

Further preference is given to the 3 layers being applied directly against one another, without interposition of connecting layers, wherein the three layers are solidly connected to each other by means of attachment points, such as tack welds capable of keeping them in a superimposed position relative to each other.

The interposition of a connecting layer, notably an adhesive layer, would have negative impacts on the rigidity of the assembly on the one hand, and on the capacitance measurement on the other hand.

More particularly, a pressure sensor capable of regulating the inflation air pressure inside a mattress composed of air-filled cells comprises a condenser composed of a dielectric insulating layer and conductive layers having the same rectangular shape, preferably between 600 and 900 mm long and 400 and 600 mm wide, wherein the total thickness of the three superimposed layers of said flat condenser is less than 10 mm and preferably less than 5 mm.

This type of pressure sensor can be used as a single sensor disposed relative to the sacral region of the person resting on the mattress, said mattress being interposed between the sensor and said person.

The thinness of the flat condenser of the invention is particularly desirable because it is possible to integrate it under a mattress without having to provide a reservation in said mattress, the flexibility of the mattress composed of layers of air-filled cells being sufficient for absorbing the slight extra thickness induced by said flat condenser.

The apparatus contemplated herein also makes provision of a support device capable of supporting the body of a person, comprising at least one top layer composed of a plurality of inflatable air-filled cells and communicating with inflation elements, comprising a sensor of the type disclosed herein, said condenser of which is disposed under said top layer and connected to an electronic control and regulating device capable of controlling the inflation or deflation elements for filling or emptying, respectively, said air cells of said top layer in such a way that the internal inflation pressure of the air inside the cells is equal to an optimum set point pressure predetermined relative to the load pressure exerted by the body of a person resting on said top layer, measured by said sensor.

More particularly, said flat condenser is applied on top of a support layer that is more rigid than said top layer, said support layer being composed of a closed-cell foam layer with a density greater than 50 kg/$m^3$, more preferably a polyether foam layer.

According to other possible characteristics of a support device of the type disclosed herein:

- a top layer composed of a plurality of air-filled cells comprises a central zone corresponding to the sacral region of the body of a person reclining on said top layer, wherein said cells of said central zone are individualized and narrower than the adjacent cells of the head zone and the foot zone on either side of said central zone;
- said top layer is supported by an air-filled bottom layer consisting of a single parallelepiped cell, said flat condenser being disposed under said bottom layer consisting of a single parallelepiped cell;
- the pressure of the air inside said bottom layer is adjusted by said control and regulation device to the same regulation pressure as said top layer, and said bottom layer comprises a safety valve capable of being automatically closed by said control and regulation device for keeping said bottom layer sealed when a leak is detected in said top layer;
- said flat condenser rests on a rigid support layer with a thickness less than or equal to 10 mm, preferably 5 mm, and said flat condenser appreciably extends over the entire width of the support device and with regard to a central zone of the support device corresponding to the sacral region of a person reclining on said top layer, and over a length of 400 to 600 mm in the longitudinal axis XX' of said support device.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

Other characteristics and features of the apparatus disclosed herein will emerge from the following detailed description of various alternative embodiments of the sensor 1 of the support device 10 of the present disclosure, with reference to the appended drawings, wherein:

FIG. 7 shows various curves consisting of: Ideal air pressure curves (solid curves) measured in heights in inches of columns of water (1H$_2$O: in. H$_2$O=250 Pa=2.5 mbar), where p is from 0 to 26 in. H$_2$O for a weight of a person ranging from 0 to 140 kg, said ideal pressures p corresponding to an ideal, experimentally determined load bearing of the patient, and Curves (dotted curves) of the frequency F (kHz) ranging from 15 to 17.5 kHz measured by an oscillator of the sensor of the present disclosure relative to the weight of a person, the different curves A, B, C, and D corresponding to:

Curve A: 0° inclination angle of the backrest of the frame on which the mattress is resting,
Curve B: 30° inclination angle of the backrest of the frame on which the mattress is resting,
Curve C: 45° inclination angle of the backrest of the frame on which the mattress is resting,
Curve D: 60° inclination angle of the backrest of the frame on which the mattress is resting.

DETAILED DESCRIPTION

Figure 1:
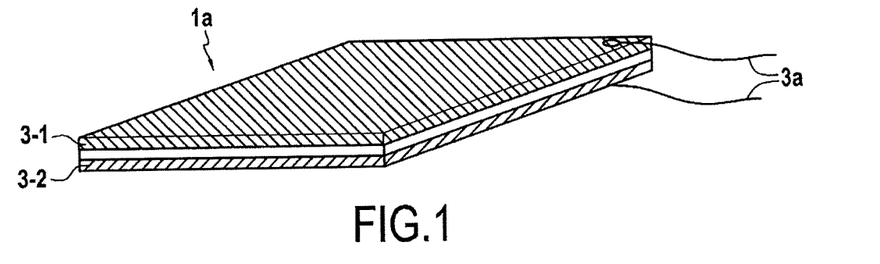
FIG. 1 shows a flat condenser of a sensor according to the present disclosure.
Figure 5A:
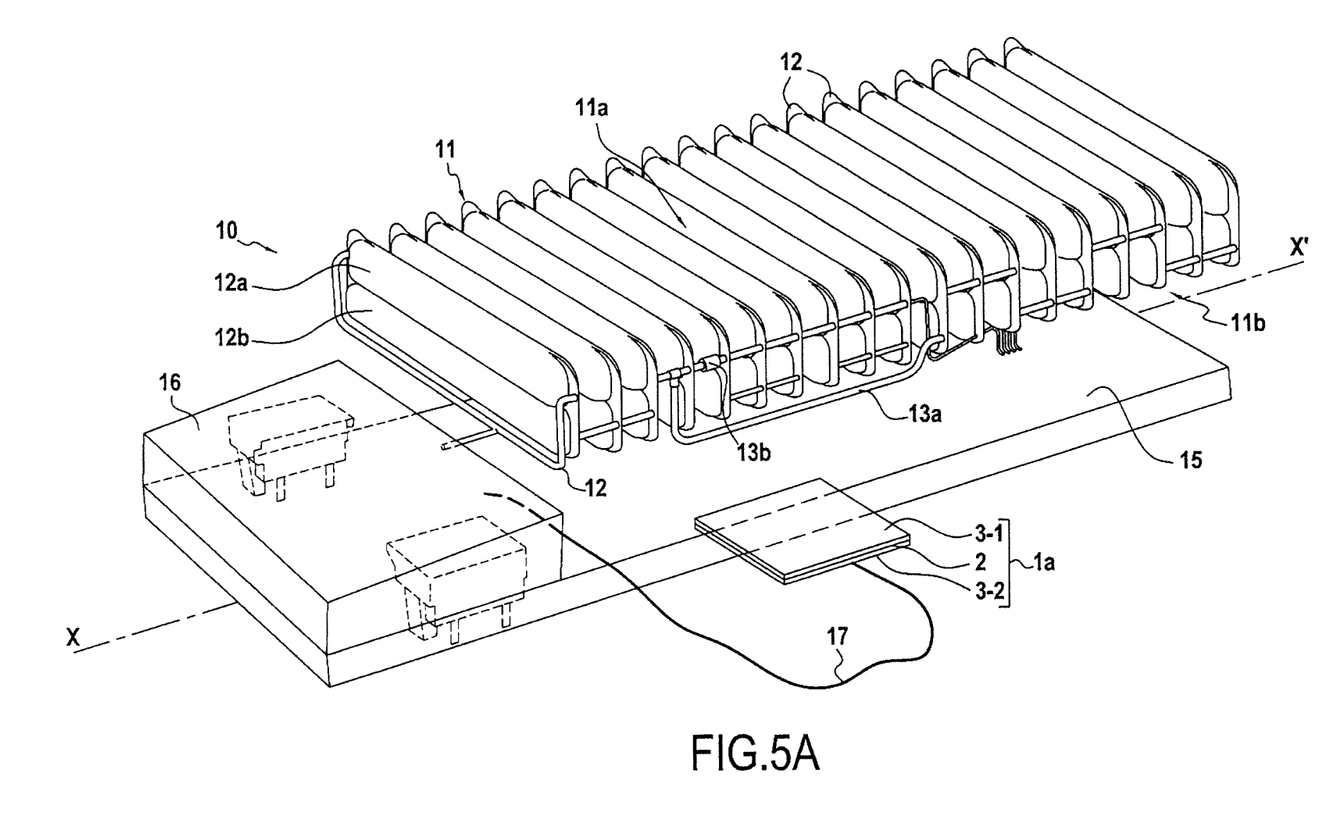
FIG. 5A illustrates a mattress-type support device comprising a top layer 11 composed of air-filled cells resting on a bottom, more rigid foam layer 15, wherein a flat condenser 1a of a sensor of the present disclosure is interposed between the top layer and the bottom layer, and said condenser 1a is connected via 17 to a control and regulation device 16 disposed at the end of the mattress.
Figure 5B:
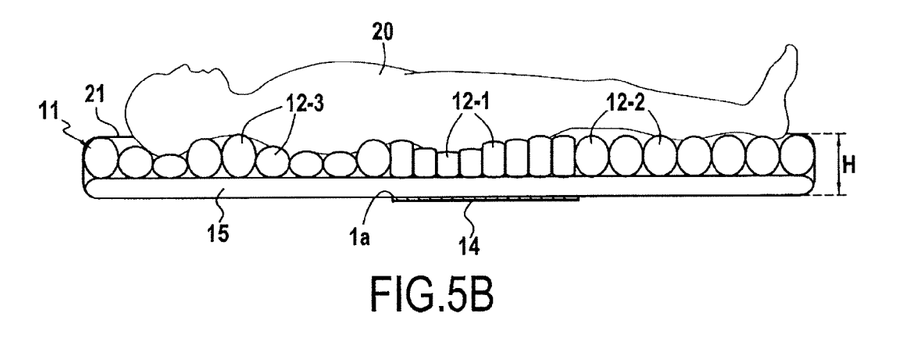
FIG. 5B shows a capacitive cell of a sensor of the present disclosure disposed under a mattress comprising a top layer constituted from a plurality of sausage-shaped, air-filled cells transversally disposed in the longitudinal axis of the mattress, wherein said top layer rests on a bottom layer constituted from a single parallelepiped cell.

FIG. 1 illustrates a flat condenser 1a of the capacitive sensor of the present disclosure designed for regulating the pressure of the air inside a mattress 11 composed of air-inflated cells 12 such as those shown in FIGS. 5A and 5B by measuring the load pressure exerted by the patient's body on the sensor and by actuating means for inflating and means for deflating the cells 12 so that the interface pressure exerted by the mattress on the person's body is reduced and the ideal load bearing of the person is achieved.

In a known manner, a single pressure sensor 1 placed under the patient in his sacral region enables the ideal inflation pressure of the air in the cells of the mattress to be determined, as summarized hereafter.

Figure 7:
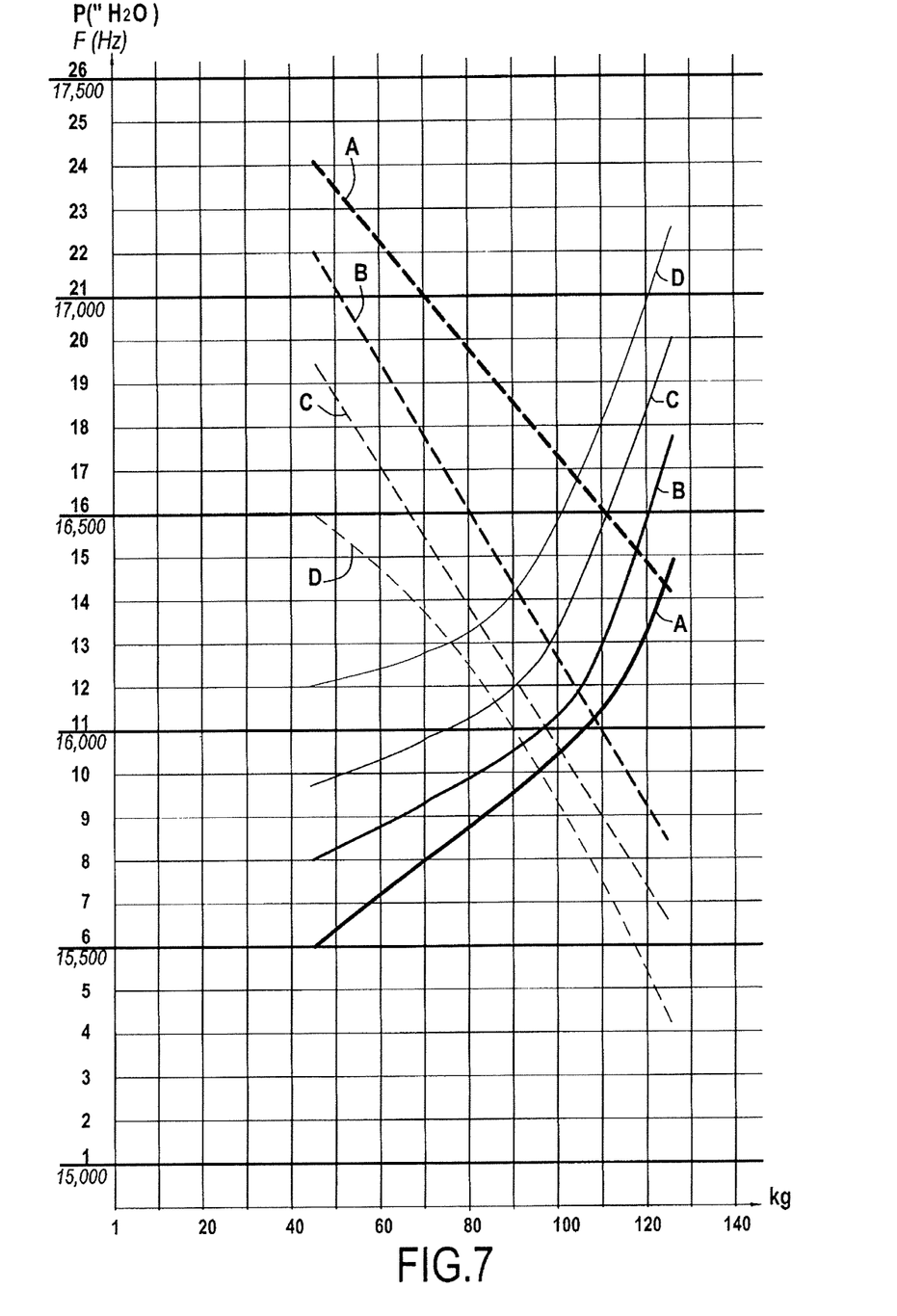

The interface pressure exerted by the mattress on the body is directly dependent on the pressure of the air in the air-filled cells. To achieve an ideal load bearing, in other words, the lowest possible interface pressures, it is preferable to increase the patient's contact surface area with the support, hence to envelope the patient as much as practically possible with the support; the best support being an immersion in a liquid or pseudo liquid. However, creation of an excessive indentation must be avoided, as the patients being treated do not necessarily have good muscle tone and tend to let themselves "sink" into the mattress, which can generate undesirable stresses, notably on the thoracic cage. Ideal air pressures are thus determined experimentally by manually varying the pressure in the air cells in order to achieve the ideal load bearing relative to a person's weight, which can be correlated to the load pressure measured by a sensor in a region of the body, as shown in the curves of FIG. 7 explained below. As the weight distribution among the different body parts is appreciably the same for all persons, with a pressure sensor in a given body region, preferably the sacral region, it is in fact possible to control an ideal inflation of the mattress relative to the various parts of the body based on the load pressure linked to the person's weight. For a given mattress type, the experimental measurements performed with patients of different weights, notably from 45 to 125 kg, make it possible to construct graphs of ideal pressures of air cells in relation to the patient's weight by adjusting the pressure of the air cells in order to achieve an ideal load bearing (minimum interface pressures and the largest possible contact zones). Several graphs have been created by varying the elevation of the backrest when the box spring on which the mattress is resting is a box spring with a hinged frame. Depending on the inclination angle, the weight of the different parts of the patient's body is transferred down to the sacrum by varying degrees. The different curves A through D of FIG. 7 represent curves obtained for different angles of inclination of the backrest on which a mattress of the type shown in FIG. 5B is resting and with a capacitive sensor comprising a condenser as in FIG. 1.

Use can be made of an air cell mattress with a single regulation pressure zone, in other words, all the cells of the mattress are adjusted to the same pressure. It is desirable, however, to have a mattress with a plurality of zones wherein each zone has a different and independently regulated pressure because neither the density nor the contact surface is the same for every body part, as mentioned above.

Based on the measurements taken by the sensor, the pressure of the air cells can be automatically regulated relative to the set point determined from the abovementioned graphs. An electronic control device 16 calculates the correct set point for regulating the air pressure in the mattress cells as a function of the data generated by the sensor placed under the patient.

A placement of the flat condenser of the sensor under the air mattress corresponding to the patient's sacrum is chosen because the sacrum is the part of the body that projects the most when the patient is reclining on his back and it is also the region on which a patient rests when in a sitting position and that exerts the greatest load pressure. Preference is also given to placement of the flat condenser of the sensor in the sacral region because as a general rule, the hinged frame is immovable in this region.

The sensor 1 of the present disclosure comprises a flat condenser 1a including a stack of 3 planar layers with the same rectangular dimensions having a layer of dielectric insulating material 2 interposed between two conductive layers 3-1, 3-2 comprising sheets of conductive material.

The middle insulating layer 2 is compressible in such a way that its thickness varies relative to the load pressure applied to its surface.

The dimensions of the 3 layers are 800 mm in length for achieving maximum coverage of the width of the hospital bed; the width of 400 mm corresponds to the dimension of the sacral region in the longitudinal axis of the mattress and represents a surface supporting approximately ⅓ of the patient's weight.

The maximum allowed weight of a patient being 240 kg in some embodiments, only ⅓ of his weight is applied directly to the sensor. Hence, the sensor must be able to generate a correct response in terms of the sensitivity and stability of the measurement over time for applied loads ranging from 0 to 80 kg in such embodiments.

The constituent element of the dielectric being a compressible material, a variation of the thickness d of the dielectric according to the load force or pressure applied to the sensor is obtained, in turn inducing a variation of the electric capacitance of the condenser.

Figure 2:
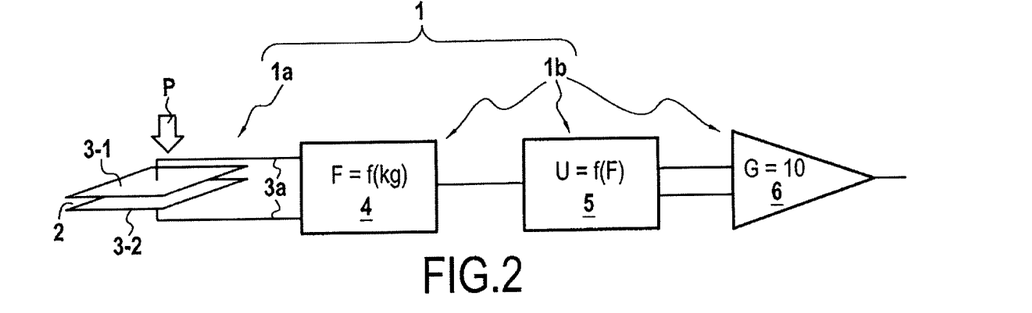
FIG. 2 shows the electronic processing device for converting the capacitance of the condenser into an electrical quantity.

A physical quantity such as electric capacitance cannot be used as is, but must be converted into an electric signal by means of an electronic device for processing the signal $1b$ shown in FIG. 2. The professional skilled in the art is familiar with various means for doing so. The assembly used here is the one described in FIG. 2 and it employs a frequency/voltage conversion. The capacitive sensor condenser $1a$ is integrated in an oscillator of astable multivibration type 4 generating a periodic rectangular signal of which the frequency varies if the capacitance of the condenser $1a$ varies.

With the aid of a convertor 5, this frequency (Hz) modulated signal is then converted into a voltage signal (Volt) of which the amplitude varies with the frequency. If the frequency of the input signal increases, the amplitude of the output voltage signal increases. Hence, a signal expressed as $U=f(F)$ is obtained, and hence $U=f(d)$ or even $U=f(kg)$. Lastly, this signal is amplified by a differential amplifier 6 for use in the control loop of FIG. 6.

This assembly exhibits good response and sensitivity properties, as it is possible to distinguish a force of 1 kg for a load ranging from 0 to 80 kg applied to the sensor, with a sensitivity greater than 50 mV/kg by using a dielectric layer composed of a compressible insulating material exhibiting the thickness and hardness characteristics defined below.

Lastly, the frequency of the oscillator varies from 15 kHz to 18 kHz for applied loads as great as 80 kg, which is above the audible frequencies that could generate an annoying whistling, and below the frequencies that could interfere with the operation of another nearby electronic device.

It is desirable that the electric signal generated by the sensor be stable over time (within acceptable drift limits) and attain its stabilization value rapidly (in a few seconds); the variation of the sensor signal should be due solely to the variation of the physical quantity being measured.

The sensitive element of the sensor is the layer of dielectric material, which is composed of a compressible material of which the characteristics have been determined by numerous tests.

A compromise between sensitivity and stability in terms of the thickness and the hardness of the compressible material is necessary.

The thickness of the layer of dielectric material is decisive. Given that the variation in capacitance has the form 1/d, an excessive thickness d would result in a condenser with very weak capacitance of which the capacitance signal could be hidden by the parasitic condensers in the measurement environment such as connecting conductors, electrical connections, or even the electric capacitance of the patient himself. Likewise, an insufficient thickness of the dielectric material would give rise to a saturation of the sensor signal as a result of the crushing of the material and in this case, the response would become constant above a certain applied load. The cumulative parasitic capacities can attain 30 pF.

A variation in capacitance ranging from 9500 pF to 7200 pF, or 33 pF/kg, is obtained for a dielectric with a thickness of 0.6 mm and for a load ranging from 0 to 80 kg applied to the sensor, whereas a variation in capacitance ranging from 5700 pF to 4320 pF, or 17 pF/kg, is obtained for a dielectric with a thickness of 1 mm.

The parasitic capacities would thus represent a quite acceptable error of 1 kg for a 0.6-mm-thick dielectric (the errors can be ignored), whereas this error would be practically doubled, i.e., 2 kg, with a 1-mm-thick dielectric. This excessively large error would then generate an unstable measurement, the parasitic capacities varying relative to the proximity or remoteness of a person, the ambient humidity, and the quality of the electrical connections. Hence, there is every advantage in having a dielectric as thin as possible, and the compromise was made with this in mind while taking into account other parameters such as sensitivity, creeping, drift over time, etc.

The rigidity of the dielectric material is also decisive. If the material is too hard, the variation of the thickness d is too low and would require too great an amplification with the risks of amplifying parasite capacities. If the material is too flexible, loads up to 60 kg cannot be distinguished without attaining the saturation of the material with complete crushing, and hence with no possibility of varying the thickness of the dielectric.

A low hardness confers good compressibility and therefore good sensor sensitivity; however, the material has the tendency to creep excessively if the sensor is subjected to a continuous load, which is the most common case for the patient reclining on the mattress. And as a consequence, the response of the sensor varies over time and it takes more time for the measurement to stabilize. In contrast, an excessively hard material hardly creeps at all and the measurement stabilizes very quickly; however, the compressibility of such a material is very low and hence the sensitivity of the sensor is greatly reduced.

The application of the present disclosure requires the use of materials in a flexible form such as a relatively thin sheet, so that the sensor is capable of accepting the movements generated by the mechanics of the frame and the box spring of the bed on which it is resting, such as the movements of the backrest or the footrest and the deformations of the plane of the bed if the latter is not completely rigid, as with a metal mesh box spring, for example. It must also be able to withstand the rolling of the condenser with the rolling of the mattress during handling.

Numerous tests and measurements have made it possible to determine the nature and characteristics of the ideal compressible dielectric material. The latter is preferably composed of a solid sheet of a solid synthetic silicone elastomer with a permittivity of 3.7 to 4.2 and a preferential thickness of at least 1 mm, preferably 0.5 to 0.6 mm, with a Shore hardness of 45 to 55 Sh, preferably 50±2 Sh.

A synthetic silicone elastomer possesses a homogeneous structure, which allows a relatively precise definition of thickness and Shore hardness tolerances. In particular, use has been made of a poly(methyl vinyl siloxane)-type silicone elastomer sold by the French company SILCOMP under the brand name Alcansil 5500/V.

Figure 4:
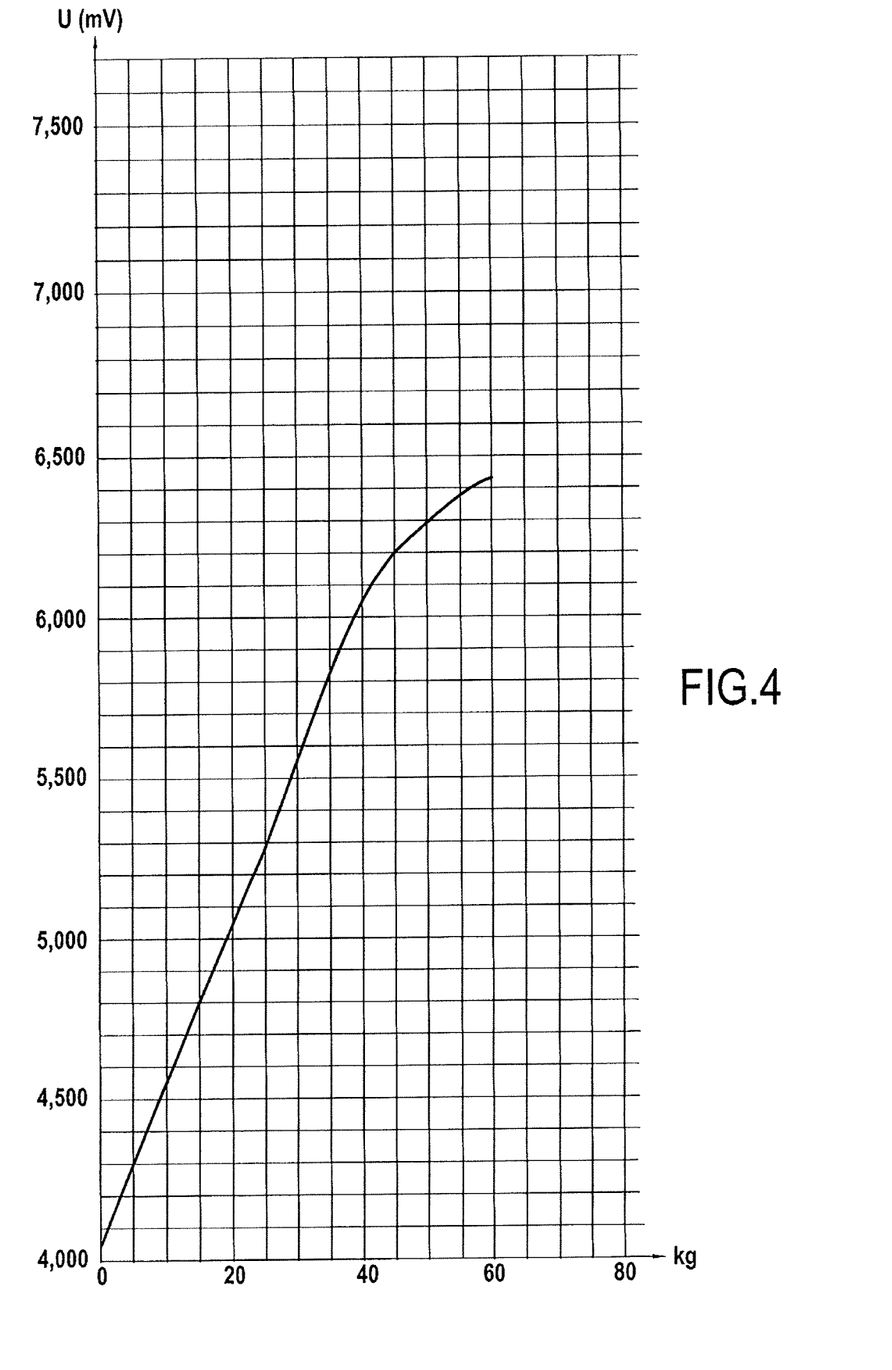
FIG. 4 shows a curve illustrating the variation in the voltage U (mV) delivered by the electronic processing device 1*b* of the sensor as a function of the load ranging from 0 to 80 kg applied to a sensor with the dimensions of 800×400 mm, exhibiting a sensitivity of 50 mV/kg.
Figure 4A:
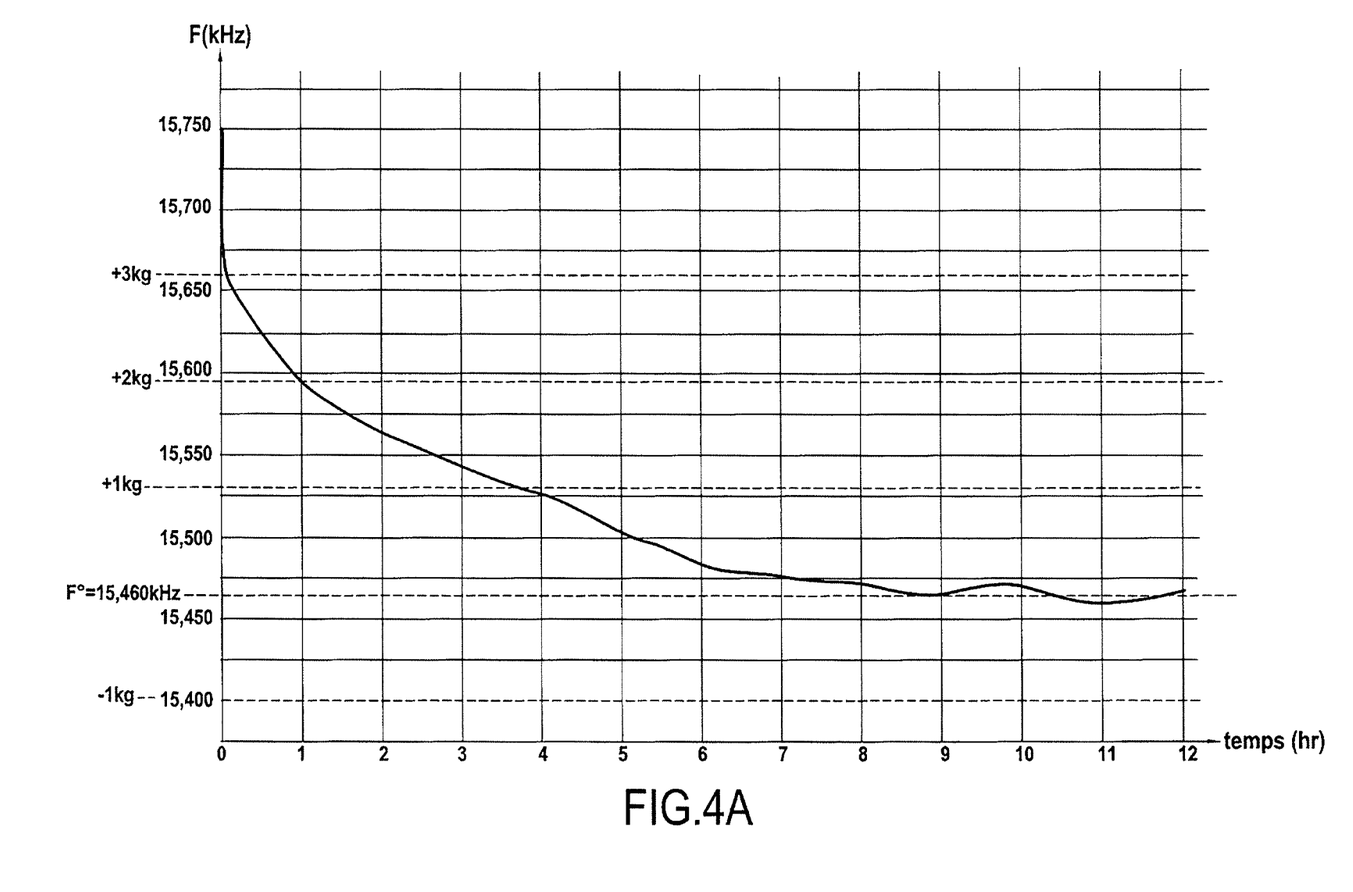
FIGS. 4A and 4B are two curves showing the stabilization time in hours (FIG. 4A) and in minutes (FIG. 4B) of the frequency signal (kHz) for a condenser comprising a 0.6-mmthick dielectric layer made of rubber with a hardness of 40 Sh (FIG. 4A) and made of silicone with a hardness of 50 Sh (FIG. 4B).
Figure 4B:
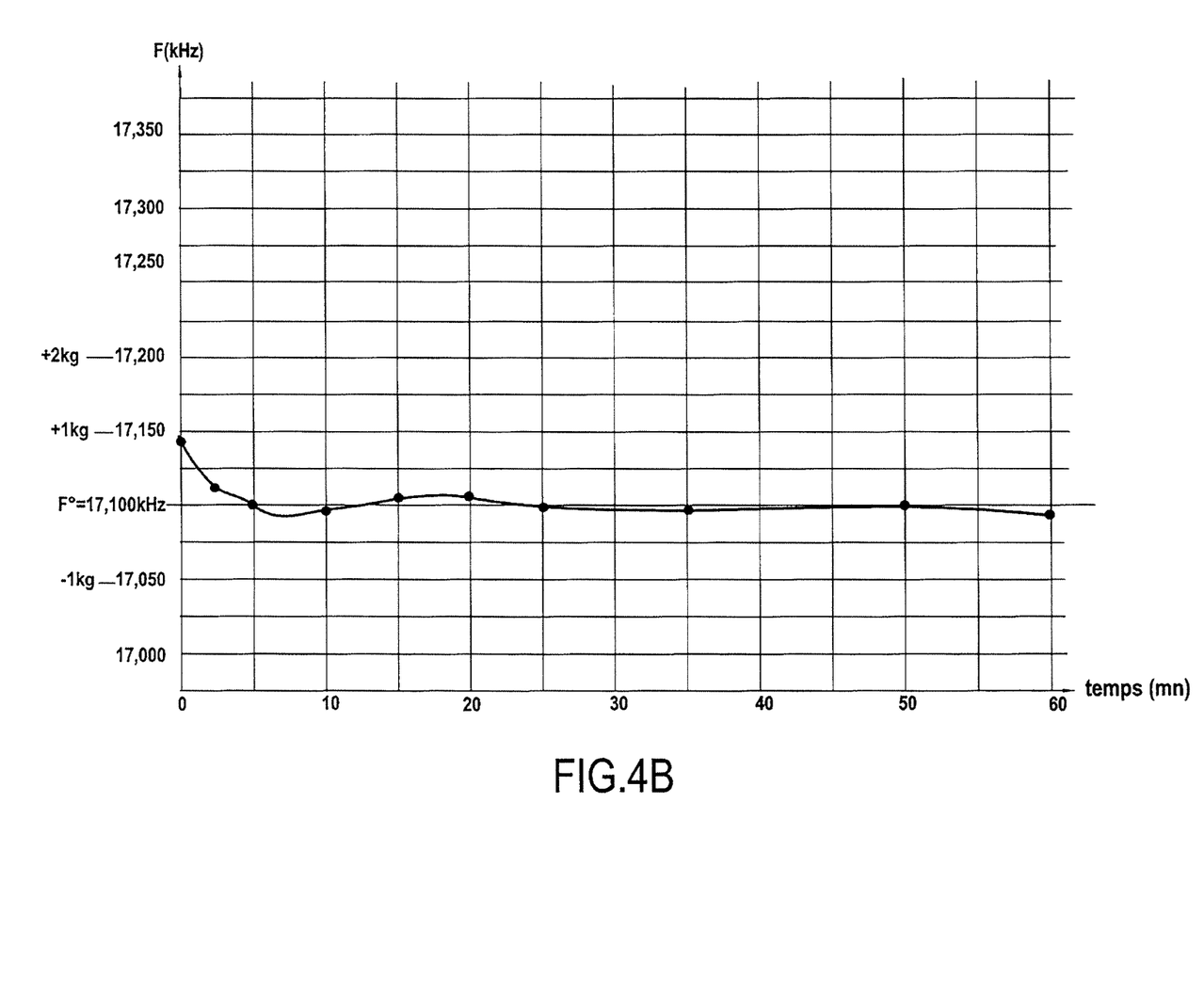

Tests enabling the definition of the characteristics of the dielectric layer concerned in particular the measurement of the stabilization time, and the measurement of the frequency or of the voltage of the sensor, as illustrated in FIGS. 4A and 4B. In FIG. 4A, it can thus be seen that a 0.6-mm-thick silicone material with a hardness of 40 Sh exhibits a significant drift in the frequency measurement over time for a continuously applied load of 60 kg. Stabilization of the response is attained after 4 hours. The stabilization of the response is considered as attained once the frequency value that would be obtained for an additional 1-kg load placed on the sensor is attained. In FIG. 4B, it can be seen that placing a 60-kg load on a silicone material with a hardness of 50 Sh induces only a slight drift, and the response stabilizes in less than 40 seconds.

The length of the stabilization time increases in direct proportion to the amount of the load applied. For 40-kg and 20-kg loads corresponding to weights of persons of 60 to 120 kg, the drifts are very slight and the measurements stabilize even more rapidly. In all cases, once the measurement stabilizes during $f_0$, a slight oscillation about this value is produced without surpassing this value, which would be obtained for loads of ±1 kg.

The conductive sheets 3-1, 3-2 in some embodiments should be flexible in order to allow the sensor to adapt to the movements of the bed frame. In contrast, the thickness of said sheets is of no significance; however, the less the thickness, the greater the gain in flexibility, lightness, and cost savings.

Metal fabrics or non-woven materials containing conductive metallic fibers are available on the market. Their surface resistivity is around 0.1 ohm/m$^2$. Resistivity is not a decisive element in the choice of a conductive material. These woven or non-woven conductive materials are used as electromagnetic shielding (Faraday cages) with, at times, complex shapes requiring a flexible structure.

Use can be made of non-woven sheets made of polypropylene containing metallic fibers, notably copper fibers, with good results. The polypropylene/copper non-woven material initially used was supplied by the US company Laird Technologies and sold under the catalog number 3027-106.

However, it has been shown that there is a variable space ratio in the sheet, which generates a significant variation in the conductive surface from one sensor to another. Moreover, as copper possesses a high oxidation potential, there can be a rapid drift of the sensor capacitance, thus altering the permittivity of the dielectric, as copper oxide is an insulator and could thus add an undesired dielectric to the principal dielectric.

For this reason, preference is given to the choice of a fabric composed of polyester threads and threads of a non-oxidizing metal such as nickel interwoven to form a mesh. The material used is a fabric composed of polyester threads and nickel (in reality, nickel-plated copper threads) threads sold by the Italian company Temas under the catalog number CF1-300C.

The polyester weaving threads constitute the textile base; their mesh and their structure confer flexibility to the fabric. However, any other synthetic plastic weaving thread would be suitable, as long as its cross-section is sufficiently small so as not to limit the flexibility of the fabric.

In practice, the thickness of each of the 2 woven conductive sheets 3-1. 3-2 is less than 2 mm so that the total thickness of the 3 stacked layers of the condenser 1*a* is less than 5 mm.

The three conductive/dielectric/conductive layers are stacked without continuous links between them, in such a way as to maintain a certain leeway for possible folding. The 3 layers are solidly connected together only by 18 tack welds in the illustrative example, thus keeping them substantially perfectly superimposed without any chance of slipping, which would affect the geometry of the sensor and consequently the reliability of the measurement. The layers are not glued together so as not to affect the rigidity on the one hand, and so as not to create parasitic capacitance drifts due to the glue in the event of deformation on the other hand.

The connection of the conductive sheets 3-1, 3-2 to the outside electronic processing device 1*b* of the condenser 1*a* is achieved in a preferential manner by connective wires 3*a* equipped with press buttons on their ends that are identical to those used for attaching EKG electrodes. This type of metal press button is widely used in the garment industry; they are inexpensive and easy to attach. The ends of the wires for connecting the sensor to the control device are equipped with a press button that is compatible with that of the sensor for enabling the coupling of these components.

The final assembly of the 3 layers of the condenser is sandwiched between two impermeable polyurethane sheets joined together by welding or by any other means in order to protect the sensor and ensure that it is relatively well sealed.

The sensor as described above made it possible to plot the response curve for the frequency variation of the oscillator converted to voltage (mV) as a function of the load applied to the sensor shown in FIG. 4, wherein the applied load varies from 0 to 80 kg, which represents ⅓ of the actual weight of a patient reclining on the total surface area of the mattress, but not exceeding the maximum 240-kg weight limit established in the technical specifications.

It can be observed that the voltage curve in relation to the load of FIG. 4 is not linear, the function being a 1/d-type function. However, quasi linearity is obtained up to 40 kg, or for a patient weighing 120 kg, in other words, for most of the population. In the linear portion of the curve, the sensitivity of the sensor is 50 mV/kg. A less steep slope is obtained for patients weighing over 120 kg. However, this is not a problem because at weights of 120 kg and above, there is a spontaneous increase in the air pressure inside the cells, as shown in the graphs of FIG. 7. This spontaneous increase in the air pressure inside the cells is due to the fact that, above a certain weight, the plastic constituting the cells cannot stretch any further; it has reached its elastic limit and as a result, the pressure inside the cells increases more strongly in relation to the weight applied to the cells. And in practice, it is no longer necessary to inflate the cells with more air in order to adjust the interface pressure to an ideal load bearing. Thanks to this less-steep slope above 120 kg, it is thus possible to avoid generating excessively high pressures in the mattress, which in turn could cause discomfort or even worse, bedsores.

Figure 3:
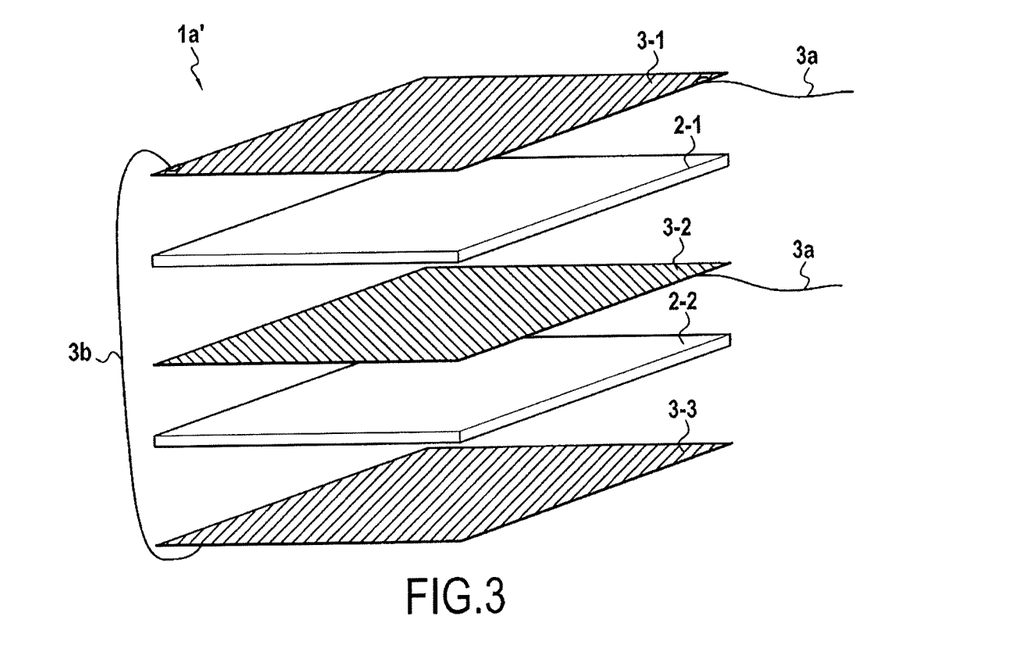
FIG. 3 shows a version of a sensor of the present disclosure comprising two condensers connected in parallel.

With a view toward increasing the sensitivity of the sensor, provision can be made of a multilayer sensor such as the one shown in FIG. 3. Starting with a first condenser comprising a first dielectric layer 2-1 interposed between a first conductive sheet 3-1 and a second conductive sheet 3-2, it is possible to create a second condenser superimposed in parallel with the first condenser simply by adding a second dielectric layer 2-2 interposed between said second conductive sheet 3-2 and a third conductive sheet 3-3, wherein said third sheet b is connected via 3*b* to the first sheet 3-1, the 2 dielectric layers and the 3 conductive sheets being stacked. The capacitance value of this condenser is the sum of the two capacities of the 2 condensers. However, the number of dielectric layers of the sensor cannot be multiplied excessively because the second top dielectric layer rests on the bottom dielectric layer and induces an undesired deformation of said bottom dielectric layer. For this reason, at most 3 or even 2 dielectric layers for constituting a multilayer sensor are conceivable.

The pressure sensor 1 of the present disclosure as previously described with reference to FIGS. 1 and 2 was more particularly developed for an application of regulating the inflation pressure of inflatable cells in support devices such as inflatable-cell therapeutic mattresses and cushions, as shall now be described with reference to FIGS. 5A and 5B, which illustrate a therapeutic mattress-type inflatable-cell support device 10.

The support device 10 makes it possible to support an element requiring support, in particular the body of a patient such as a human being. It comprises an inflatable mattress 11 comprising at least one inflatable cell 12, wherein said cell can either be closed or equipped with a controllable bleeding element. As illustrated in FIG. 5A, preference is given to the mattress 11 being composed of a multiplicity of inflatable cells 12 communicating with each other via lines 13*a* and pneumatic connection valves 13*b*. The inflatable cells 12 can be of any type known to the professional skilled in the art and notably formed by horizontally welding two flexible sheets made of polyurethane (PUR) or of another suitable thermoplastic material.

In FIG. 5A, the cells 12 are delimited by a weld into two superimposed air-filled chambers 12*a*, 12*b* communicating at their ends. More particularly, said elements formed as individual units in the support zone are composed of sausage-shaped cells extending in the direction YY' crosswise relative to the longitudinal axis XX' of the mattress and arranged side by side in the longitudinal axis of the mattress, the opposite lateral sides of each cell being connected to each other by a linking element such as a strut (FIG. 5B) or a longitudinal weld (FIG. 5A) extending along a portion of the length of said cells and not extending all the way to their ends, particularly a weld located appreciably in the middle relative to the height of the cell, conferring an appreciably constant width to the cells regardless of their inflation level.

The inflatable mattress 11 exhibits a top side 11*a* designed to receive an element requiring support, such as a patient's body, and a bottom side 11*b* resting on a bottom layer forming a reference surface 15, generally composed of a mattress made of a cellular material such as high-density foam, which can rest directly or indirectly on a box spring, which is not shown here. Preference is given to placement of the condenser 1*a* under the therapeutic mattress 11 and on top of the more rigid bottom layer 15, as it is preferable to have an appreciably flat and rigid surface supporting the sensor so that the compression of the dielectric material is due solely to the load pressure generated by the patient, thus applied from top to bottom. In the opposite case, in other words, if there were a flexible surface supporting the sensor, the force applied would indent the sensor into the flexible surface, which would absorb a portion of the force applied (the heavier the patient, the greater the portion that would be absorbed) and the compression of the dielectric material would diminish. The response of the sensor would thus be parasitized. If the box spring is not sufficiently rigid, the sensor is applied on top of a rigid layer 15 of closed-cell foam with a high density, notably greater than 50 kg/m$^3$ and composed of polyether, for example. This bottom support layer 15 supports the sensor 1*a*.

As shown in FIG. 5B, preference is given to use of a mattress of the type described in EP-2 005 929 comprising in the sacral region, i.e., a central zone of the mattress, an inflatable top layer composed of a plurality of inflatable elements or cells 12-1 formed as individual units and exhibiting a width less than their height, with more preference being given to a width of said individualized inflatable elements of said central support zone less than the width of the non-individualized inflatable elements 12-2, 12-3 of an end zone of the mattress adjacent to said central support zone. "Individualized zone" is understood to mean that said cells 12-1 are not joined together along their entire length, but only at their ends. Thus joined, said individualized cells change shape independently of each other in such a way that the zone more effectively molds to the shape of the patient resting on top of it, as the cells, by virtue of their individualized constitution, possess a greater crosswise stability, regardless of their level of inflation, compared to juxtaposed cells welded together along their entire length. Furthermore, the central support zone thus created has a greater density of cells so that there is no risk of the patient falling through the cells, particularly in the event of deflation when the cells are inflated in an alternating pressure mode.

In FIG. 5B, the support device is composed of two cell layers, namely:

a top layer 11 composed of a plurality of sausage-shaped cells 12 disposed in an axis perpendicular to the longitudinal axis XX' of the support device of said top layer comprising a central zone in which the cells 12-1 are individualized, in other words, joined together only at their ends and not along their entire length, and narrower than the adjacent cells 12-2 of the foot zone and the adjacent cells 12-3 of the head zone, said cells 12-1 exhibiting a width of approximately 50 mm in the inflated state, whereas the adjacent cells 12-2 and 12-3 exhibit a width of around 100 mm in the inflated state, said cells 12-1, 12-2, and 12-3 all exhibiting the same height of around 90 mm, and a bottom layer 15 constituting a mattress pad, said bottom layer 11*a* being constituted from a single parallelepiped air-filled cell 70 mm in height, extending along the entire length of the support device in the axis XX' and across its entire width in the transverse axis; the flat condenser 1*a* is disposed under the mattress pad 11*a*.

In FIG. 5B, the flat condenser 1*a* rests on a high-density foam support layer 14 with a reduced thickness, notably of less than 5 mm. The assembly consisting of the flat condenser and the rigid foam support layer 14 with a thickness of less than 10 mm is disposed under the mattress pad 15. Given the reduced thickness of the capacitive cell 1*a* and the support layer 14, it is not necessary to provide a reservation in the bottom layer 15 and/or in the top layer 11, the reduced thickness of the assembly consisting of the flat condenser and its rigid support 14 being absorbed by the deformation of said bottom layer 15 and said top layer 10, which is an advantage in terms of economics. The mattress pad 15 is adjusted to the same pressure as the therapeutic mattress of the top layer 10. However, this mattress pad 15 comprising a single cell is regulated in continuous mode, whereas the top layer 10 can be regulated in alternating mode, i.e., by inflating every other cell alternately.

The mattress pad 15 has a safety function because it comprises a latching valve allowing it to be sealed automatically by the control and regulation device 16 when the pressure inside the top layer drops below a critical minimum value, notably in the event of an air leak caused by a puncture, for example. Generally, a sound and/or visual alarm is also activated, the locking of the mattress pad constituting a safety measure allowing time for a technical intervention and for preventing the patient from coming to rest on the hard surface of the frame of the bed. The frame of the bed is in fact typically composed of a plurality of rigid plates, possibly hinged relative to each other.

Lastly, the assembly of said top layer 11, said bottom layer 15, said flat condenser 1*a*, and said rigid support layer 14 are enveloped in a common impermeable envelope 21 in some embodiments.

The control and regulation device 16 is, in some embodiments, disposed in an extension of the mattress 11 at one end of said mattress, on the bottom layer 15. In particular, it comprises means for filling the cells 12 of the mattress 11 with air, wherein said means consist of a compressor or a pump connected by lines 13 and valves 14 to the cells 12 for filling them with or emptying them of a filling fluid, particularly air.

Figure 6:
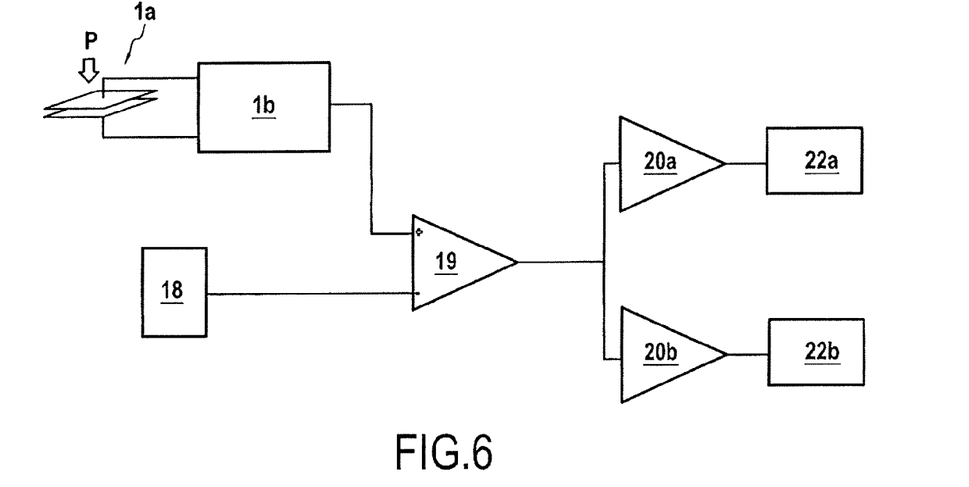
FIG. 6 shows a diagram of the control loop for regulating the air pressure relative to the data gathered with the aid of a capacitive sensor of the present disclosure and of a pressure sensor 18 measuring the pressure of the air inside the cells.

The control and regulation device 16 also comprises electronic elements (not shown) for controlling the filling means that are in turn under the control of the pressure measurement means 18 inside the cells. These pressure measurement means 18 are linearly mounted and series-mounted in the hydraulic connection lines 13*a* between the cells.

The condenser 1a is connected by an electrical connection 17 incorporating the links 3a to the control and regulation device 16.

Preference is given to the integration of the assembly formed from the top layer 11 and the bottom support layer 15, the control and regulation device 16, the lines 13a and valves 13b, and the sensor 1 in a protective cover 21, which is preferably also detachable in order to allow easy access to the elements of the support device as well as to allow easy replacement or cleaning, as needed.

When the patient is positioned on the mattress, the sensor 1 is subjected to a compression stress and its capacitance varies in proportion to the weight of the patient in relation to his body surface area ($kg/cm^2$). The variation in capacitance thus takes into account the patient's morphology because the information will be different, for example, for two persons of the same weight but with different pelvic widths who do not have the same degree of indentation in the mattress and hence do not exert the same load pressures.

This variation in capacitance is taken into account by the control and regulation device 16, which modifies its regulation set point in proportion to the variation in capacitance. A comparator 20a-20b of the control and regulation device 16 compares the pressure in the cells 12 to the new set point by means of an air pressure sensor 18. If the pressure is too high relative to the new set point, the control and regulation device 16 opens a deflation electrovalve. If the pressure is too low relative to the new set point, the control and regulation device 16 activates the inflation system. A prior art wiring diagram of the control loop for regulating the pressure inside the cells is illustrated in FIG. 6.

A summing amplifier 19 at one of its inputs receives the voltage signal Up from the air pressure sensor 18 for measuring the air pressure inside the mattress; its other input receives a signal Uc from the capacitive sensor 1 of the invention, wherein "signal Uc" is understood to mean a signal corresponding to the set point air pressure determined from the graphs as a function of the patient's weight deduced from the measurement of the capacitive sensor of the invention. The result of this operation is a signal $U0=Uc-Up$. At this point, there are three possible cases; they are processed by a comparator 20a-20b:

- Up=Uc: Equilibrium is attained, in other words, the air pressure in the mattress has reached its equilibrium value, or the set point pressure determined from the graphs,
- Up<Uc: the air pressure in the mattress is too low 20a, the compressor 22a is actuated until the pressure reaches Up=Uc, the pressure at which the compressor is shut off, an equilibrium pressure having been reached,
- Up>Uc: the air pressure in the mattress is too high 20b, the opening of the emptying electrovalve 22b is actuated, the air pressure in the cells drops to Up=Uc. The emptying electrovalve is then closed again because the equilibrium pressure has been reached. If Uc increases or decreases, the above case then applies.

It should be noted that the pressure regulation functions for a variation of the two variables Uc and/or Up; it is possible to have a variation of the air pressure of the mattress Up (if additional weight is added to the mattress, generating an increase in pressure, for example), or it is possible to have a variation of the sensor signal Uc (if the patient changes position), and it is also possible to have both signals Uc and Up varying at the same time, but stabilizing at a given moment (elevation of the backrest).

In practice, there is only one equilibrium point Up=Uc; however, there is an equilibrium window or range. The regulation zone would otherwise be too narrow and the slightest variation of Uc or Up would cause this equilibrium zone to be surpassed, which would bring about an instability of the system; the zone is widened by introducing a hysteresis on either side of the equilibrium point, reinstating a 3-state regulation with a regulation window.

The sensor 1 comprising the condenser 1a and the signal processing device 1b are adaptable to any type of mattress. On the other hand, the set point values according to the graphs of FIG. 7 and the operating conditions of the summing amplifiers 19 and the comparator 20a, 20b are adapted in relation to the type of mattress concerned.

In FIG. 7, the solid curves represent the ideal air pressure curves or set point pressures of the cells relative to the patient's weight and the inclination angle of the backrest, whereas the dotted curves correspond to the actual frequency response of the oscillator of the sensor as a function of the patient's weight and the inclination angle of the backrest. It should be noted that the frequency variation is inversely proportional to the patient's weight and the inclination angle of the backrest; in other words, the more the load on the sensor increases, the more the frequency diminishes, thus indicating a good reactivity of the sensor in the mattress.

As a general rule, a single condenser 1a is disposed under the sacral support zone and it is possible to deduce therefrom the pressure in other regions of the body of the patient reclining on the support device, inasmuch as 80% of all persons have a similar mass/volume distribution among the different parts of their bodies. For those persons who do not fall within this average norm or in order to obtain an even more specific response, several sensors 1 can be installed in the support device under the various parts of the body.

It is also possible to measure the patient's morphology by using several sensors (smaller ones carefully positioned) enabling the patient's weight and size to be calculated based on the response of the sensors, or by using pre-prepared graphs. The position coordinates of the patient can also be analyzed from these same sensors if they are sufficient in number (the greater the number of sensors, the more accurate and reliable the localization); hence, it is possible to analyze the behavior of the patient over a period of time when, for example, the patient is agitated, the patient presses up against the rails, or the patient curls up at one end of the bed.

Although certain illustrative embodiments have been described in detail above, variations and modifications exist within the scope and spirit of this disclosure as described and as defined in the following claims.

The invention claimed is:

1. A sensor for detecting and measuring a load pressure applied to a support device, the sensor comprising at least one capacitive cell including a flat condenser comprising at least one layer of a compressible dielectric insulating material interposed between two layers of conductive material, wherein said layer of compressible dielectric material has a thickness of between 0.3 to 1 mm.

2. The sensor of claim 1, wherein said capacitive cell is integrated in an oscillator capable of generating a periodic electric signal, wherein the frequency of said periodic electric signal varies as a function of said load pressure within a range of 15 to 30 kHz, with a variation of at least 45 Hz/kg for a weight of 0 to 80 kg applied to the surface of said flat condenser.

3. The sensor of claim 2, wherein said oscillator is coupled to a converter for converting the frequency of the periodic electric signal output by the oscillator to a voltage signal.

4. The sensor of claim 1, wherein the layer of dielectric insulating material comprises a sheet of a synthetic elastomer with a Shore hardness of 45 to 55 Sh.

5. The sensor of claim 1, wherein said conductive layers comprise sheets of fabric comprising, at least partially, metallic threads of a non-oxidizing metal.

6. The sensor of claim 5, wherein said conductive sheet comprises woven material made from threads of nickel and threads of a plastic that is at least one of polyester and polypropylene.

7. The sensor of claim 1, wherein the sensor is used to regulate the inflation air pressure inside a mattress comprising air-filled cells, wherein the at least one layer of compressible dielectric insulating material and the two layers of conductive material have the same rectangular shape of between about 600 and 900 mm long and between about 400 and 600 mm wide, and wherein the total thickness of the at least one layer of compressible dielectric insulating material and the two layers of conductive material when superimposed together is less than 10 mm.

8. A sensor for detecting and measuring a load pressure applied to a support device, the sensor comprising at least one capacitive cell including a flat condenser comprising at least one layer of a compressible dielectric insulating material interposed between two layers of conductive material, wherein the at least one layer of compressible dielectric insulating material and the two layers of conductive material are applied directly against each other without interposed connecting layers, wherein the at least one layer of compressible dielectric insulating material and the two layers of conductive material are solidly connected to each other by tack welds that are capable of keeping the at least one layer of compressible dielectric insulating material and the two layers of conductive material in a superimposed position relative to each other.

9. A support device capable of supporting the body of a person, the support device comprising
at least one top layer having a plurality of air-filled inflatable cells communicating with inflation elements, and
a sensor for detecting and measuring a load pressure applied to at least some of the air-filled inflatable cells of the plurality of air-filled inflatable cells, the sensor comprising at least one capacitive cell including a flat condenser comprising at least one layer of a compressible dielectric insulating material interposed between two layers of conductive material, wherein said layer of compressible dielectric material has a thickness of between 0.3 to 1 mm, said condenser being disposed under said at least one top layer and connected to an electronic control and regulation device designed to control the inflation or deflation elements for filling or emptying, respectively, said plurality of air-filled inflatable cells of said top layer in such a way that the internal inflation pressure of the air inside the cells is equal to an ideal set point pressure predetermined relative to the load pressure of the body of a person resting on said top layer, measured by said sensor.

10. The support device of claim 9, wherein said flat condenser is situated on top of a support layer that is more rigid than said top layer, said support layer comprising a closed-cell foam layer with a density greater than 50 kg/m$^3$.

11. The support device of claim 9, wherein said top layer comprises a central zone corresponding to the sacral region of the body of a person reclining on said top layer, of which said cells are individualized and narrower than the adjacent cells of a head zone and a foot zone on either side of said central zone.

12. The support device of claim 9, wherein said top layer is supported by an air-filled bottom layer constituted from a single parallelepiped cell, wherein said flat condenser is disposed under said bottom layer.

13. The support device of claim 12, wherein the pressure of the air inside said bottom layer is adjusted by said control and regulation device to the same regulation pressure as said top layer, and said bottom layer comprises a safety valve that is automatically closed by said control and regulation device in order to keep said bottom layer sealed when a leak is detected in said top layer.

14. The support device of claim 9, wherein said flat condenser rests on a rigid support layer with a thickness less than or equal to 10 mm, and said flat condenser extends appreciably across the entire width of the support device and in relation to a central zone of the support device corresponding to the sacral region of a person reclining on said top layer, and over a length of about 400 to 600 mm in the longitudinal axis of said support device.

15. A support device capable of supporting the body of a person, the support device comprising
at least one top layer having a plurality of air-filled inflatable cells communicating with inflation elements, and
a sensor for detecting and measuring a load pressure applied to at least some of the air-filled inflatable cells of the plurality of air-filled inflatable cells, the sensor comprising at least one capacitive cell including a flat condenser comprising at least one layer of a compressible dielectric insulating material interposed between two layers of conductive material, said condenser being disposed under said at least one top layer and connected to an electronic control and regulation device designed to control the inflation or deflation elements for filling or emptying, respectively, said plurality of air-filled inflatable cells of said top layer in such a way that the internal inflation pressure of the air inside the cells is equal to an ideal set point pressure predetermined relative to the load pressure of the body of a person resting on said top layer, measured by said sensor, wherein the at least one layer of compressible dielectric insulating material and the two layers of conductive material are applied directly against each other without interposed connecting layers, wherein the at least one layer of compressible dielectric insulating material and the two layers of conductive material are solidly connected to each other by tack welds that are capable of keeping the at least one layer of compressible dielectric insulating material and the two layers of conductive material in a superimposed position relative to each other.

* * * * *